(12) United States Patent
Wang et al.

(10) Patent No.: US 11,648,885 B2
(45) Date of Patent: May 16, 2023

(54) FOLDABLE BIKE RACK

(71) Applicants: Chiu Kuei Wang, Taichung (TW);
Hugues Espesset, Taichung (TW);
Frederic Girod, Taichung (TW)

(72) Inventors: Chiu Kuei Wang, Taichung (TW);
Hugues Espesset, Taichung (TW);
Frederic Girod, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/382,124

(22) Filed: Jul. 21, 2021

(65) Prior Publication Data
US 2022/0203903 A1 Jun. 30, 2022

(30) Foreign Application Priority Data
Dec. 25, 2020 (TW) .................................. 109217104

(51) Int. Cl.
*B60R 9/10* (2006.01)
*B60R 9/06* (2006.01)
(52) U.S. Cl.
CPC . *B60R 9/10* (2013.01); *B60R 9/06* (2013.01)
(58) Field of Classification Search
CPC .................................... B60R 9/06; B60R 9/10

USPC ......................................................... 224/488
See application file for complete search history.

(56) References Cited

U.S. PATENT DOCUMENTS

| 3,912,098 | A | * | 10/1975 | Nicotra | ..................... B60R 9/10 |
| | | | | | 224/521 |
| 3,921,842 | A | * | 11/1975 | Campbell | ................. B60R 9/06 |
| | | | | | 414/480 |
| 5,462,398 | A | * | 10/1995 | Hymer | ...................... B60R 9/10 |
| | | | | | 414/537 |
| 5,699,985 | A | * | 12/1997 | Vogel | ........................ B60R 9/06 |
| | | | | | 224/521 |
| 8,272,547 | B1 | * | 9/2012 | Mital | ........................ B60R 9/10 |
| | | | | | 224/501 |
| 9,096,182 | B1 | * | 8/2015 | Roth | ........................ B60R 11/00 |
| 10,315,584 | B2 | * | 6/2019 | Kuhlbach | ................. B60R 9/10 |
| 2002/0154980 | A1 | * | 10/2002 | Potts | ........................ B60R 9/06 |
| | | | | | 414/470 |
| 2019/0023190 | A1 | * | 1/2019 | Breen | ...................... B60R 9/10 |

* cited by examiner

*Primary Examiner* — Peter N Helvey
(74) *Attorney, Agent, or Firm* — Che-Yang Chen; Law Office of Michael Chen (57) ABSTRACT

A bike rack includes a base and a bike rack. The base is connected to a vehicle and the bike rack is foldably connected to the base. The bike rack includes two sets of supports for supporting and securing the bike front wheel and the bike rear wheel. A locking unit is connected to each support and includes a hooking member. By pressing a pressing end of the hooking member, the bike rack is easily folded or expanded relative to the base.

8 Claims, 11 Drawing Sheets

FOLDABLE BIKE RACK

BACKGROUND OF THE INVENTION

1. Fields of the Invention

The present invention relates to bike rack, and more particularly, to a foldable bike rack.

2. Descriptions of Related Art

The conventional bike racks are connected to the rear end of a vehicle, and some of the conventional bike racks are foldable for storage purpose. When folding or expanding the bike rack, the user needs to support the bike rack and use the other hand to operate the switch. This may not be convenient for some users.

The present invention intends to provide a foldable bike rack to eliminate shortcomings mentioned above.

SUMMARY OF THE INVENTION

The present invention relates to a bike rack and comprises a base having two sets of supports, and each of the supports is pivotably connected to the base by a first pivot so that the supports are pivoted upward to a folded position and pivoted downward to a use position. The base includes a first column which has at least one hole defined therethrough. A second column transversely extends through the at least one hole. Two rods are connected to two ends of the second column. Each of the rods includes at least one U-bar connected thereto. Each support is a U-shaped board and has a slot. A locking unit is connected to each support and located corresponding to the slot and the U-bar. Each locking unit includes a seat, a second pivot, a torsion spring and a hooking member. The torsion spring is mounted to the second pivot, wherein one of two ends of the torsion spring is connected to the seat and another one of the two ends of the torsion spring is connected to the hooking member. The hooking member is a C-shaped member and includes a pressing end and a hooking end. The pressing end is connected to the torsion spring. The hooking member is connected to the seat. The hooking end is detachably hooked to the at least one U-bar via the slot.

When the pressing end is pressed, the hooking member is pivoted about the second pivot and is disengaged from the U-bar. The torsion spring provides a recovery force to return the hooking member.

Preferably, the first column is located between the two sets of the supports. Two bridge bars are respectively connected between the two sets of supports so that the two sets of the supports are pivoted together.

Preferably, each of the supports includes a fastening strip.

Preferably, the base includes a post, and a frame is connected to the top of the post.

Preferably, the post includes multiple first bores. The frame includes a mounting portion extending from the lower end thereof. The mounting portion includes multiple second bores. Multiple connection members extend through the first and second bores to adjustably connect the frame to the post.

Preferably, each of the supports is connected with a rail.

Preferably, the base includes a vehicle plate board so that the vehicle plate is secured to the vehicle plate board.

Preferably, the base includes two turning lights.

The advantages of the present invention are that the supports are easily folded or expanded by pressing the pressing end of the hooking member. The frame on the post is adjustable in different heights and directions so as to save transportation and storage room and transportation cost.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
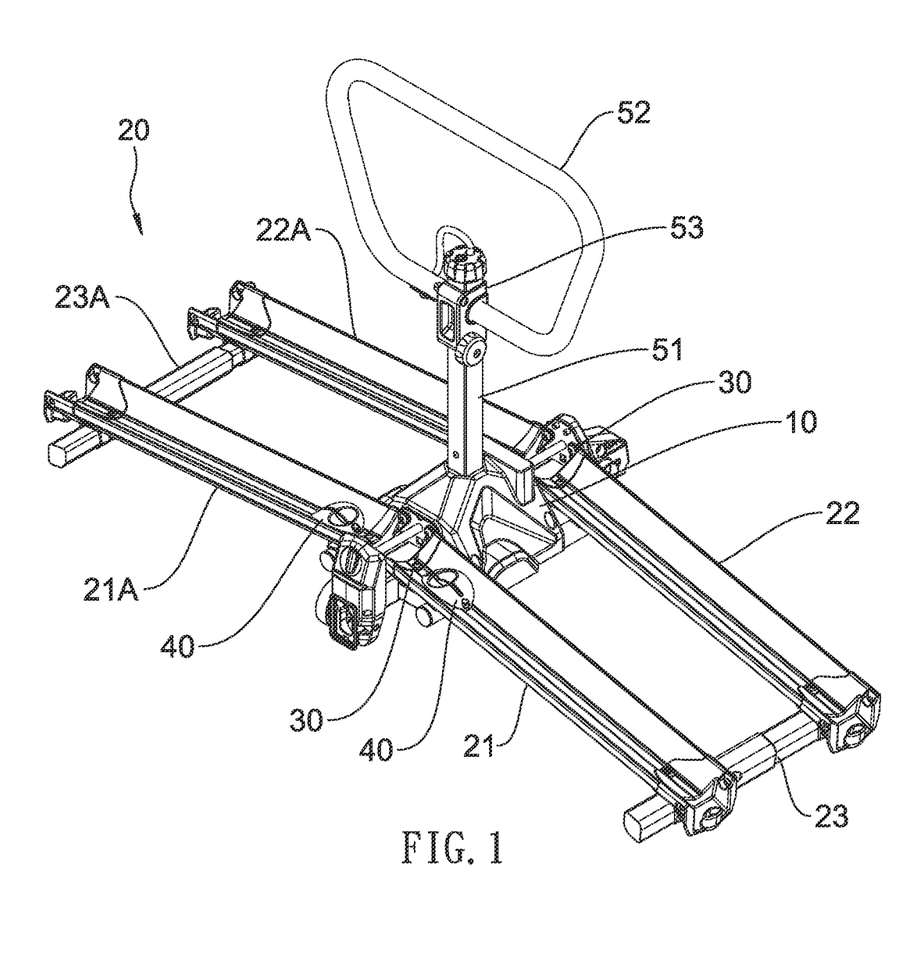
FIG. 1 is a perspective view to show the bike carrier of the present invention.
Figure 2:
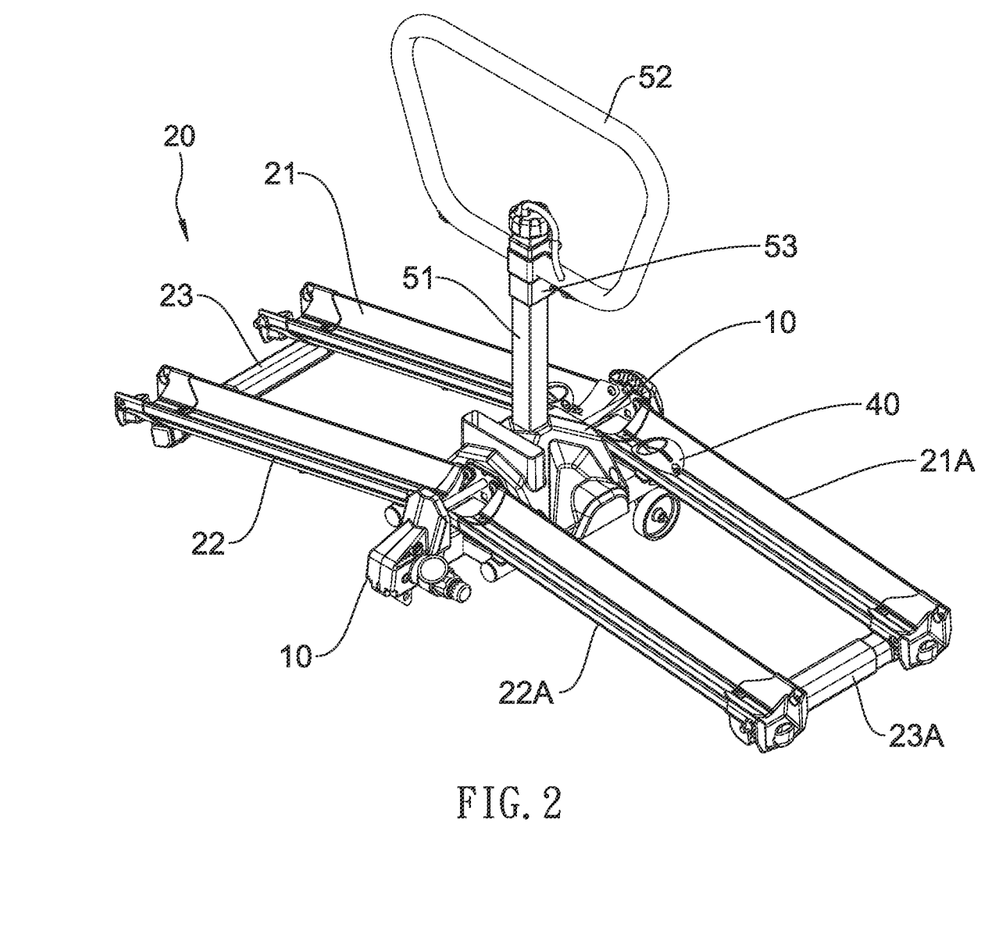
FIG. 2 is another perspective view to show the bike carrier of the present invention.
Figures 3A, 3B:
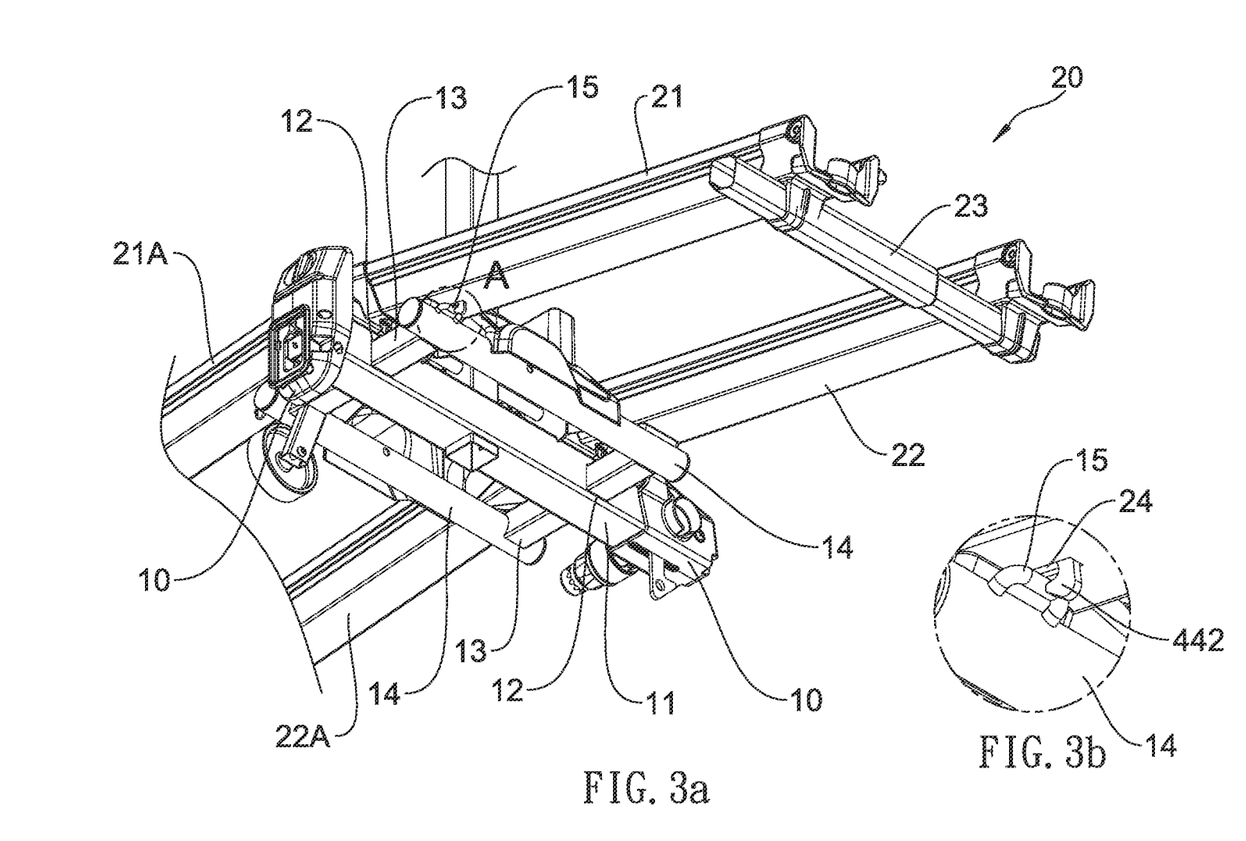
FIG. 3a shows the base from the underside of the bike carrier of the present invention.
FIG. 3b is an enlarged view to show the hooking member and the U-bar.
Figure 4:
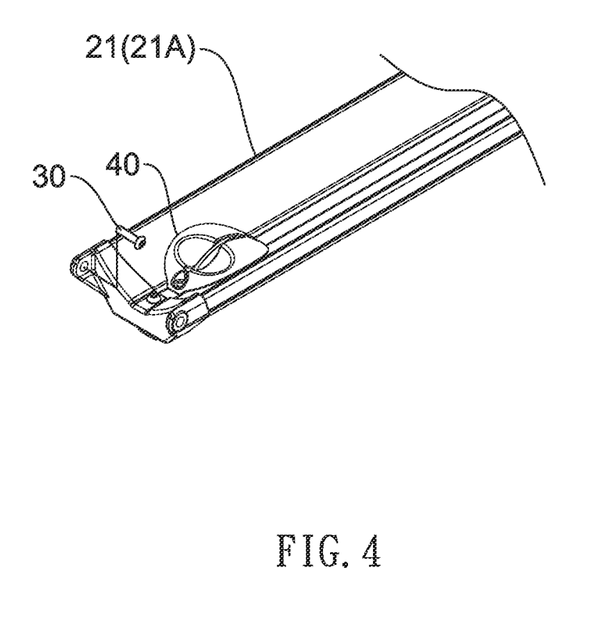
FIG. 4 shows that the locking unit is connected to one of the supports.
Figure 5:
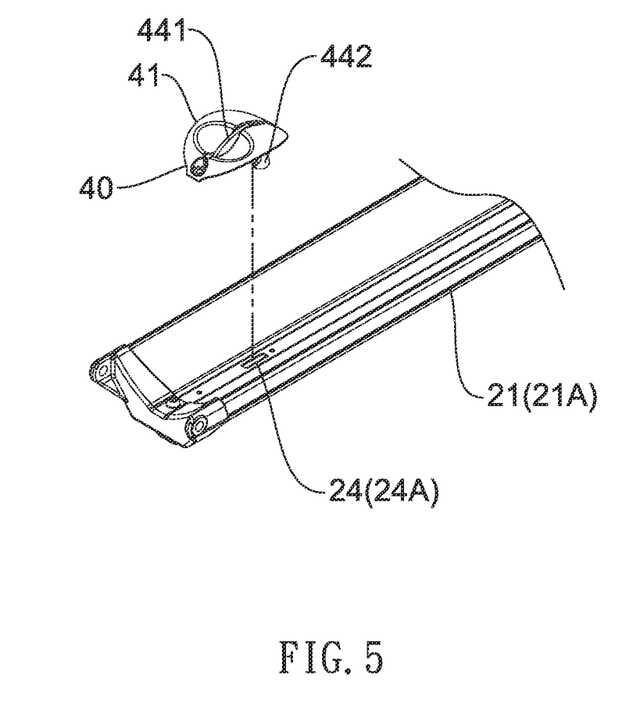
FIG. 5 is an exploded view to show the locking unit and the support disclosed in FIG. 4.
Figure 6:
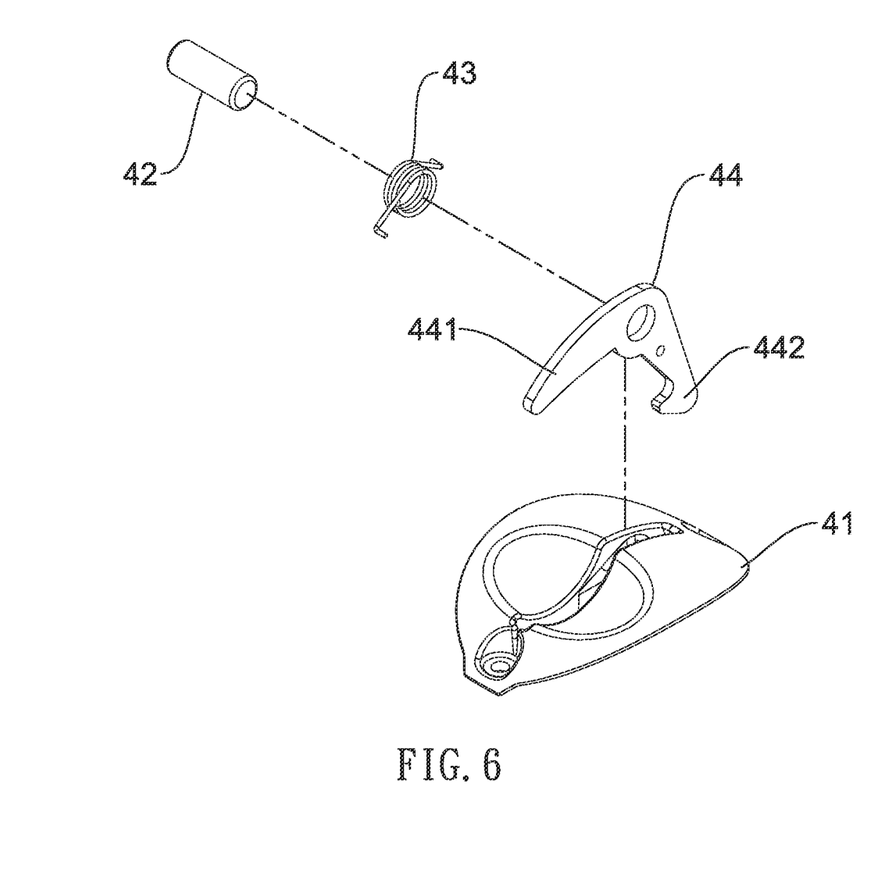
FIG. 6 is an exploded view to show the locking unit.
Figure 7:
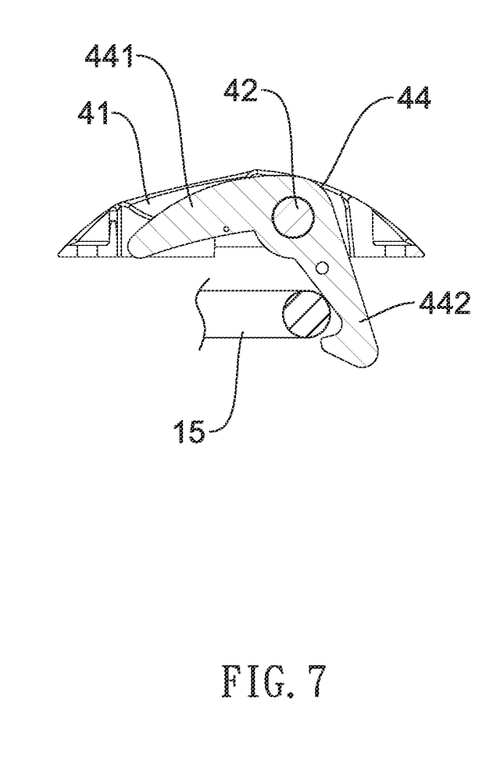
FIG. 7 shows that the hooking end of the hooking member is to be hooked to the U-bar.

Referring to FIGS. 1 to 9, the present invention comprises a base 10 and a bike rack 20, wherein the base 10 is connected to a vehicle (not shown), and the bike rack 20 is able to secure at least one bike. In this embodiment, the bike rack includes two sets of supports 21, 21A, 22, 22A respectively located on two sides of the bike rack. Each of the supports 21, 21A, 22, 22A is pivotably connected to the base 10 by a first pivot 30 as shown in FIG. 4, so that the supports 21, 21A, 22, 22A are pivoted upward to a folded position and pivoted downward to a use position.

As shown in FIG. 3a, the base 10 includes a first column 11 which has two holes 12 defined therethrough, and two second columns 13 respectively and transversely extend through the holes 12. Two rods 14 are connected to two ends of each of the second columns 13. Each of the rods 14 includes at least one U-bar 15 connected thereto. The first column 11 is located between the two sets of the supports 21, 21A, 22, 22A. That is to say, the supports 21, 22 are located on one side of the base 10, and the supports 21A, 22A are located on the other side of the base 10. Two bridge bars 23, 23A are respectively connected between the supports 21, 22, and the supports 21A 22A so that the two sets of the supports 21, 21A, 22, 22A are pivoted together.

As shown in FIGS. 4 to 8, each support 21, 21A, 22, 22A is a U-shaped board and has a slot 24/24A. As shown in FIG. 3b, the locking unit 40 is connected to each support 21, 21A, 22, 22A and located corresponding to the slot 24/24A and the U-bar 15. Each locking unit 40 includes a seat 41, a second pivot 42, a torsion spring 43 and a hooking member 44. The torsion spring 43 is mounted to the second pivot 42. One of two ends of the torsion spring 43 is connected to the seat 41 and another one of the two ends of the torsion spring 43 is connected to the hooking member 44. The hooking member 41 is a C-shaped member and includes a pressing end 441 and a hooking end 442. The pressing end 441 is connected to the torsion spring 43. The hooking member 44 is connected to the seat 41. The hooking end 442 is detachably hooked to the U-bar 15 via the slots 24/24A as shown in FIG. 3b.

Figure 8:
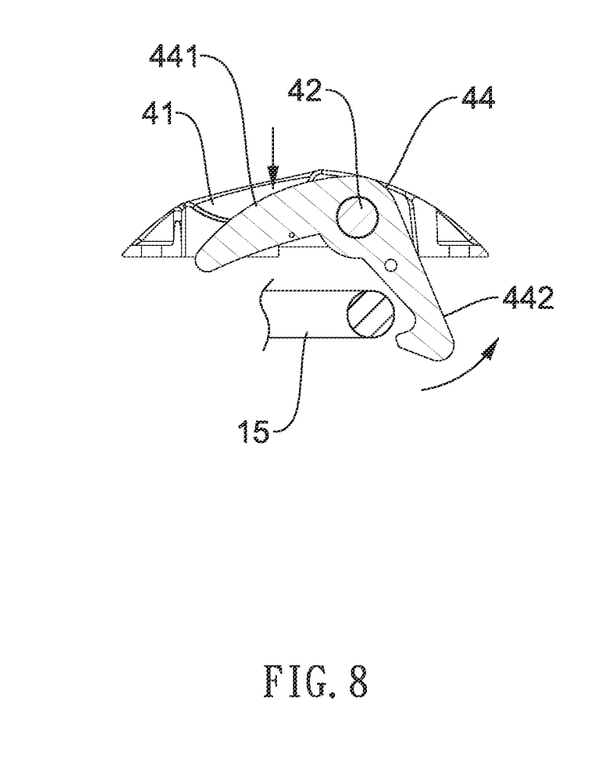
FIG. 8 shows that the hooking end of the hooking member is to be separated from the U-bar by pressing the pressing end of the hooking member.
Figure 9:
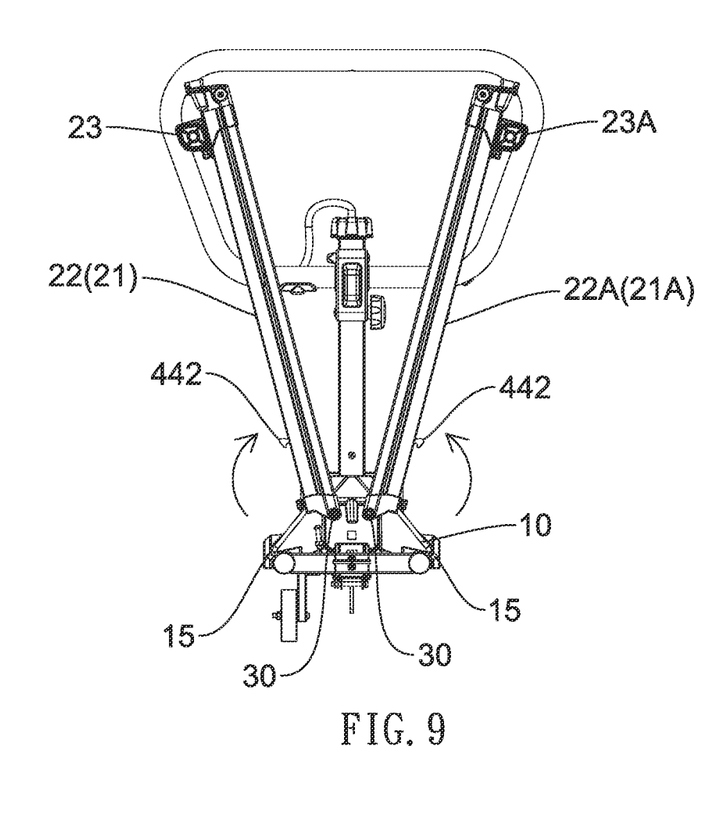
FIG. 9 shows that the supports of the bike rack are folded.
Figure 10:
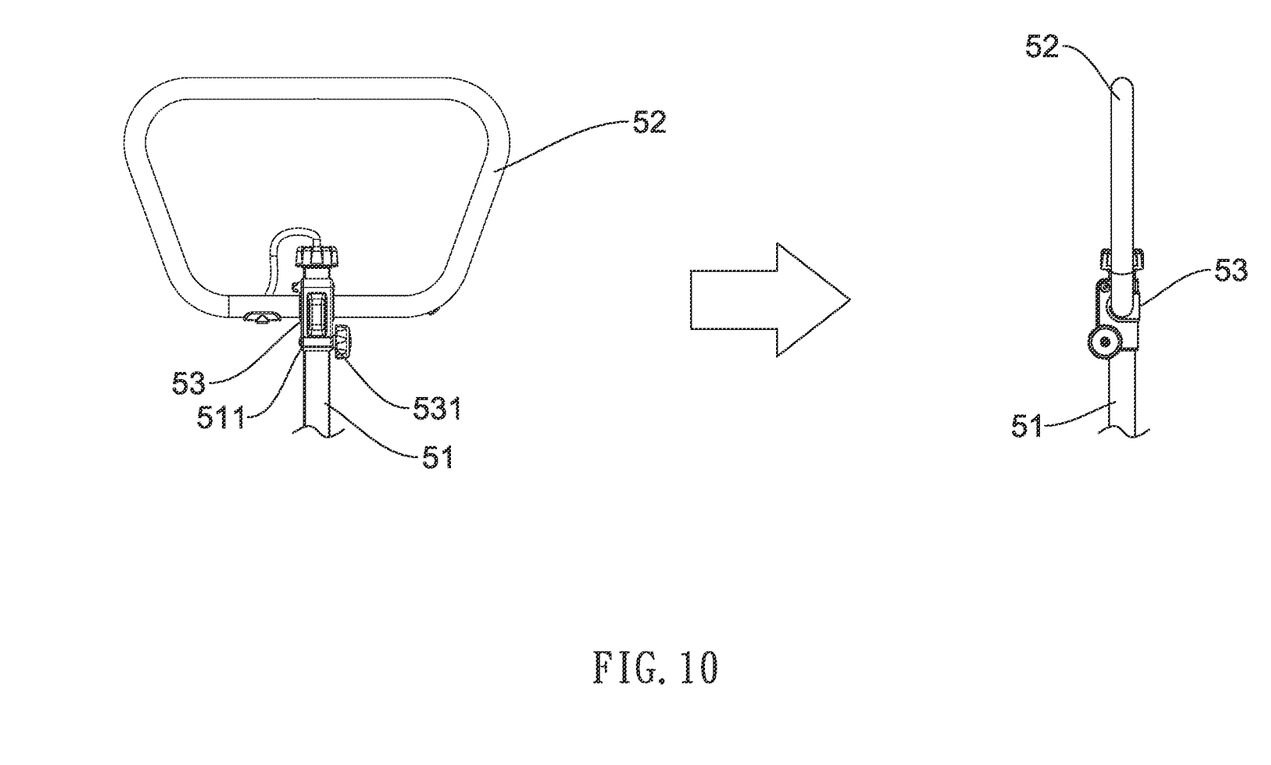
FIG. 10 shows that the frame on the post is positioned in different heights and directions.

When the pressing end 441 is pressed, the hooking member 44 is pivoted about the second pivot 42 and is disengaged from the U-bar 15, so that the supports 21, 21A, 22 or 22A can be pivoted to be folded or expanded. The torsion spring 43 provides a recovery force to return the hooking member 44.

As shown in FIGS. 1 to 3, and 10, the base 10 includes a post 51, and a frame 52 is connected to the top of the post 51. The post 51 includes multiple first bores 511. The frame 52 includes a mounting portion 53 extending from the lower end thereof. The mounting portion 53 includes multiple second bores 531. The mounting portion 53 is mounted to the top section of the post 51, and multiple connection members such as pin, bolts and the like, extend through the first and second bores 511, 531 to adjustably connect the frame 52 to the post 51. The frame 52 on the post 51 is adjustable in different heights and directions so as to save transportation and storage room and transportation cost.

Figure 11:
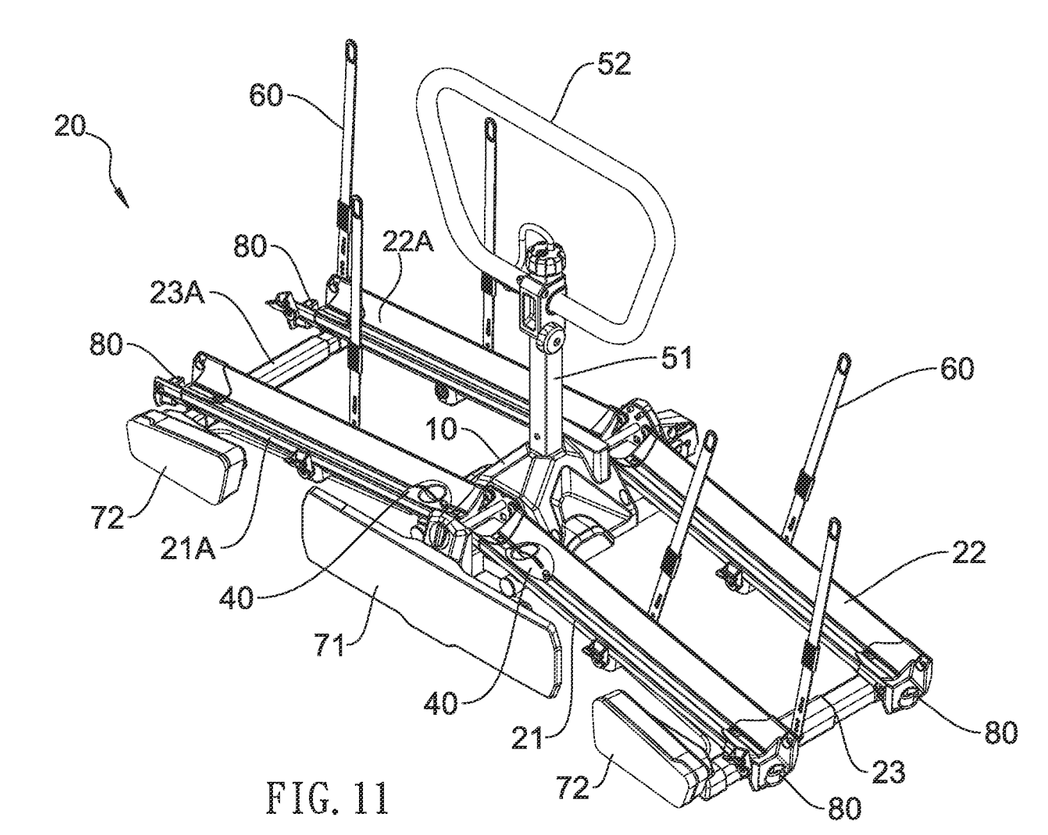
FIG. 11 shows the bike carrier includes fastening strips, turning lights and vehicle plate board.

As shown in FIG. 11, in order to secure the bikes on the supports 21, 21A, 22, 22A, each of the supports 21, 21A, 22, 22A includes a fastening strip 60.

Figure 12:
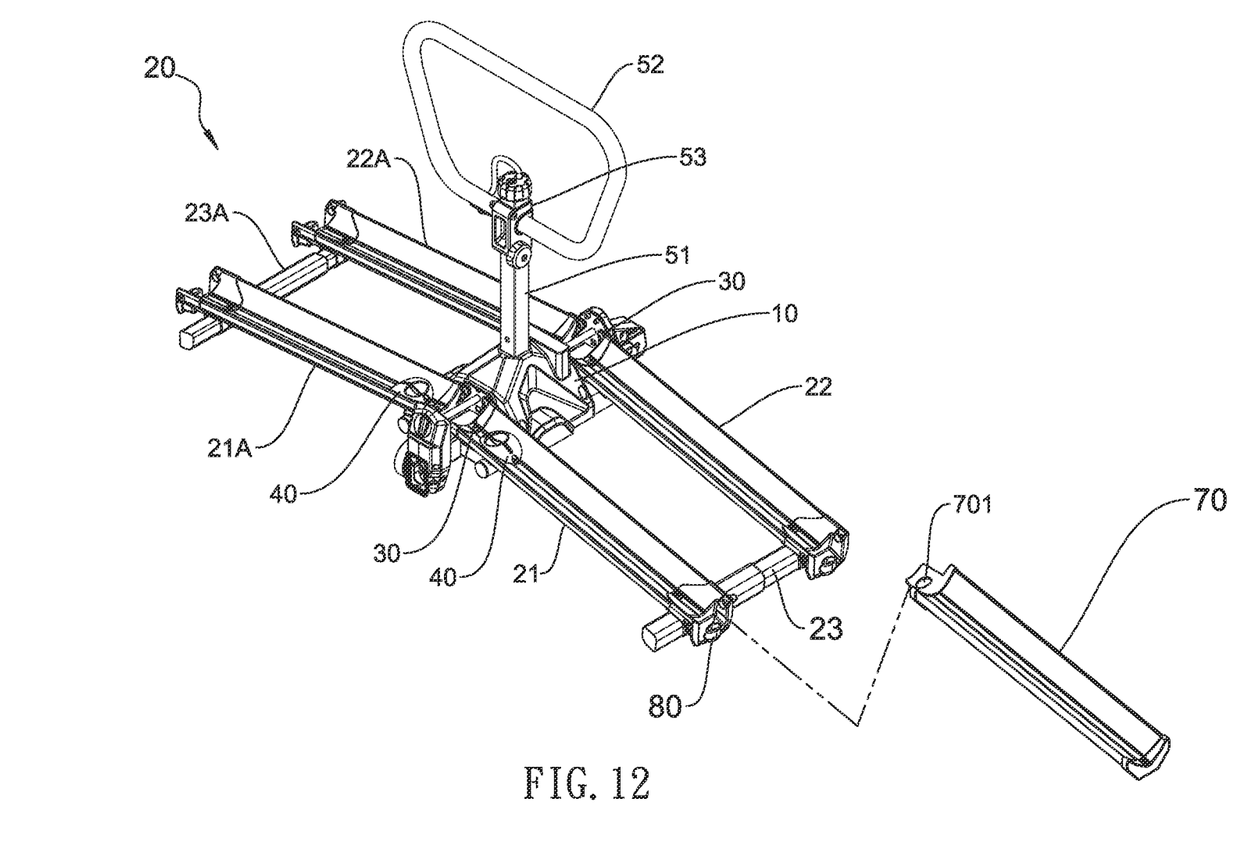
FIG. 12 shows a rail is to be connected to one of the supports.

As shown in FIGS. 11 and 12, each of the supports 21, 21A, 22, 22A is connected with a rail 70. Specifically, each of the supports 21, 21A, 22, 22A includes a protrusion 80 formed to the distal end thereof. Each rail 70 includes a recess 701 formed to the first end thereof, so that the protrusion 80 is engaged with the recess 701 to connect the rail 70 to each of the supports 21, 21A, 22, 22A. The second end of the rail 70 contacts the ground. The bikes can be easily moved to the supports 21, 21A, 22, 22A via the rails 70.

The base 10 includes a vehicle plate board 71 so that the vehicle plate can be fixed to the vehicle plate board 71. In addition, the base 10 includes two turning lights 72 to provide safety features during transportation of the bikes.

While we have shown and described the embodiment in accordance with the present invention, it should be clear to those skilled in the art that further embodiments may be made without departing from the scope of the present invention.

What is claimed is:

1. A bike rack comprising:
a base having two sets of supports, each of the supports pivotably connected to the base by a first pivot so that the supports are pivoted upward to a folded position and pivoted downward to a use position, wherein:
the base includes a first column which has at least one hole defined therethrough, a second column extends through the at least one hole, two rods are connected to two ends of the second column, each of the rods includes at least one U-bar connected thereto, each support is a U-shaped board and has a slot, a locking unit is connected to each support and located corresponding to the slot and the U-bar, each locking unit includes a seat, a second pivot, a torsion spring and a hooking member, the torsion spring is mounted to the second pivot, one of two ends of the torsion spring is connected to the seat and another one of the two ends of the torsion spring is connected to the hooking member, the hooking member is a C-shaped member and includes a pressing end and a hooking end, the pressing end is connected to the torsion spring, the hooking member is connected to the seat, the hooking end is detachably hooked to the at least one U-bar via the slot, when the pressing end is pressed, the hooking member is pivoted about the second pivot and is disengaged from the U-bar, the torsion spring provides a recovery force to return the hooking member.

2. The bike rack as claimed in claim 1, wherein the first column is located between the two sets of the supports, two bridge bars are respectively connected between the two sets of supports so that the two sets of the supports are pivoted together.

3. The bike rack as claimed in claim 1, wherein each of the supports includes a fastening strip.

4. The bike rack as claimed in claim 1, wherein the base includes a post, a frame is connected to a top of the post.

5. The bike rack as claimed in claim 4, wherein the post includes multiple first bores, the frame includes a mounting portion extending from a lower end thereof, the mounting portion includes multiple second bores, multiple connection members extend through the first and second bores to adjustably connect the frame to the post.

6. The bike rack as claimed in claim 1, wherein each of the supports is connected with a rail.

7. The bike rack as claimed in claim 1, wherein the base includes a vehicle plate board.

8. The bike rack as claimed in claim 1, wherein the base includes two turning lights.

\* \* \* \* \*